US011900898B2

(12) United States Patent
Crisp

(10) Patent No.: US 11,900,898 B2
(45) Date of Patent: Feb. 13, 2024

(54) PORTABLE ONE PIECE MAINTENANCE MAT WITH NECK SUPPORT

(71) Applicant: Gabriel Crisp, Knoxville, TN (US)

(72) Inventor: Gabriel Crisp, Knoxville, TN (US)

( * ) Notice: Subject to any disclaimer, the term of this patent is extended or adjusted under 35 U.S.C. 154(b) by 0 days.

(21) Appl. No.: 17/521,920

(22) Filed: Nov. 9, 2021

(65) Prior Publication Data

US 2022/0148539 A1 May 12, 2022

Related U.S. Application Data

(60) Provisional application No. 63/111,190, filed on Nov. 9, 2020.

(51) Int. Cl.
*G10D 3/00* (2020.01)
*G10G 7/00* (2006.01)

(52) U.S. Cl.
CPC ................. *G10D 3/00* (2013.01); *G10G 7/00* (2013.01)

(58) Field of Classification Search
CPC ............... G10D 3/00; G10G 7/00; G10G 5/00
See application file for complete search history.

(56) References Cited

U.S. PATENT DOCUMENTS 1,222,563 A 4/1917 Nathan
5,381,717 A 1/1995 Brokaw
5,396,824 A 3/1995 Souza
5,833,051 A 11/1998 Tiefenbrun et al.
6,182,309 B1 2/2001 Sullivan
D779,585 S 2/2017 Dedrick
9,564,112 B1 2/2017 Corbitt
2005/0285003 A1 12/2005 Craw
2021/0330059 A1* 10/2021 Ellis ...................... A45D 44/10

FOREIGN PATENT DOCUMENTS

CA 2296714 7/2001
CN 206774237 U 12/2017
CN 25781199 U * 7/2020 .............. G10D 3/00
GB 2445242 A 7/2008
KR 201602948 U 8/2016

OTHER PUBLICATIONS

International Search Report PCT/US2021/056394 dated Jan. 18, 2022 (pp. 1-14).

* cited by examiner

*Primary Examiner* — Kimberly R Lockett
(74) *Attorney, Agent, or Firm* — MILLEN, WHITE, ZELANO & BRANIGAN, P.C.; Jennifer J. Branigan

(57) ABSTRACT

The present invention relates to a portable one piece maintenance mat with neck support. The maintenance mat has a neck support cushion having a having a centrally located indent on the topside adapted to receive the neck of a stringed instrument. The neck support is attached at the proximal end of the mat to the bottom side of said neck support. Closures are attached to the distal end of the mat. The mat is adapted to roll around said neck support and be removably secured by the closure.

10 Claims, 4 Drawing Sheets

PORTABLE ONE PIECE MAINTENANCE MAT WITH NECK SUPPORT

The present invention relates to a portable one piece maintenance mat with neck support for stringed instruments. The portable one piece maintenance mat allows for quick string changes while protecting the instrument from nicks and scratches. When not in use the maintenance mat is adapted to roll around the neck support and fasten in a closed configuration. This allows for easy transport and storage.

Musicians often change instruments strings with their instrument on their lap, on a towel, on a stage or directly on a hard surface (e.g., table) where it may become damaged. The presently claimed portable one piece maintenance mat with neck support is particularly advantageous to touring musicians who must maintain their stringed instruments in constantly changing environments and move their equipment from location to location.

When in use, the claimed device can be utilized to securely receive and position the neck of a stringed musical instrument when the same is not being played. When so used, the main body can be positioned onto a table, a stage floor or other flat surface. Next, a user can simply place the neck of the instrument into the indent of the neck support and rest the lower body of the guitar on the upper layer of the mat portion of the device. Owing to the non-slip nature of the underside of the mat, the device will remain stable and will not slide; therefore ensuring the instrument remains in a stable condition while changing strings or while not being played. Such a feature also allows a user to position the guitar in an almost horizontal position with little to no stress on the neck of the instrument.

When not in use, the maintenance mat rolls around the neck support and is removably secured with a closure element.

Prior art maintenance mats and neck supports are two piece. Consequently, the user is constantly repositioning as the two pieces slide around. Moreover, prior art maintenance mats and neck supports have two pieces to keep track of, thus, touring musicians often misplace or lose pieces while moving from location to location.

While the preferred embodiment is shown with a guitar, as those of skill in the art will recognize, the invention disclosed herein can be used in conjunction with a variety of stringed instruments with necks (e.g., violin, banjo, fiddle etc.).

Upon further study of the specification and appended claims, further objects and advantages of this invention will become apparent to those skilled in the art.

BRIEF DESCRIPTION OF THE DRAWINGS

Various features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE INVENTION

For purposes of this description, the terms “upper”, “bottom”, “end”, “under side”, “proximal end”, “distal end” and “lower” shall relate to the invention as oriented in FIGS. 1 to 4.

Neck Support Cushion

Figure 1:
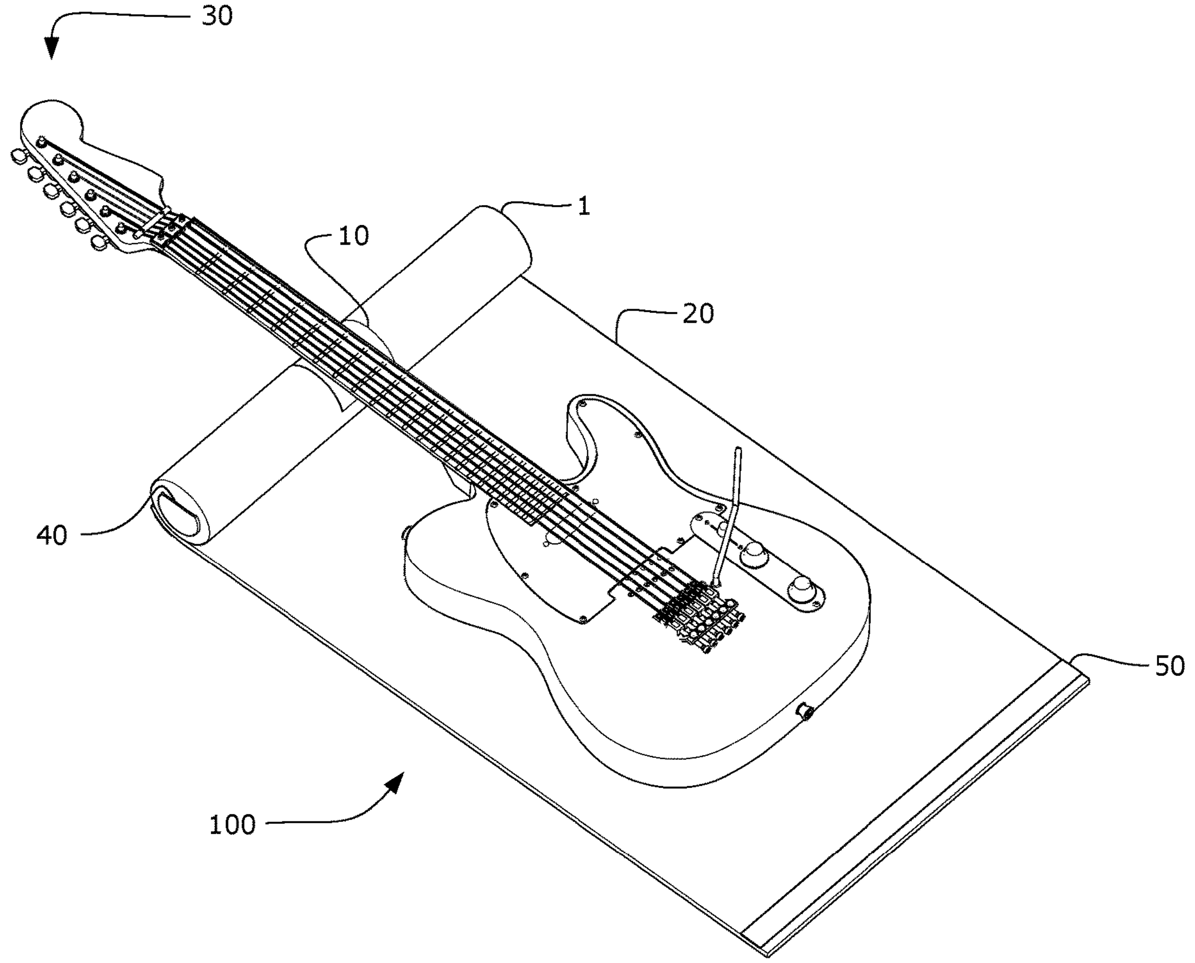
FIG. 1 is an isometric view illustrating one embodiment of the claimed portable one piece maintenance mat with neck support 100 showing a guitar neck (30) resting within the neck support indent (10) of the neck support cushion (1). A maintenance mat (20) is attached to the neck support cushion. An optional pocket (40) is also shown. A closure strip (50) is shown on the upper side of the maintenance mat (20).

The neck support cushion is preferably made of a soft foam material. The length of the neck cushion will correspond to the width of the mat such as shown in FIG. 1. The indent on the neck support cushion is adapted to receive the neck of a guitar or other stringed instrument. The indent must be large enough to accommodate the neck of a stringed instrument. For example, the indent is designed to match the height of the neck of a typical acoustic guitar when the body portion of the same guitar is resting on the mat. The neck support indent can optionally have additional removable foam pieces which allow the indent to vary in height and width. A musician may prefer different angles, depending on the instrument. For example, some musicians prefer a lower support for electric guitars and a higher support for acoustic guitars. The width of the indent can also vary depending the instrument. The indent may be V-shaped or U shaped. A typical indent has a depth between 1.25 inches and 2.25 inches. The opening of the indent is generally between 2 to 5 inches, preferably the opening is between 2.5 and 3.7 inches. For most guitars a V-shaped indent with a depth of between 1.5 and 2 inches is preferred. In certain embodiments custom inserts are used to create an insert profile which is adapted to the neck of the specific instrument.

As the claimed invention is adapted to be rolled up and secured when not in use, it is preferred that the neck support cushion is of a generally cylindrical shape. The neck support cushion is preferably formed of a material that is rigid enough so the same does not become deformed when the weight of a musical instrument is placed thereon. Of course, any number of other lightweight rigid or semi rigid materials may be used to form the next support. For example, the neck support may made of Styrofoam, high density foam, high resilience foam, polyurethane, memory foam, closed cell foam, and/or open cell foam. Preferably, the neck support is made of a polyethylene or polystyrene foam such as the type used for pipe insulation or pool noodles. Polyethylene is a durable, light-weight, closed-cell material with vibration dampening and shock resistance properties.

Maintenance Mat

The maintenance mat acts to protect the body of the instrument. Preferably the mat is made of a soft textured or anti-slip surface to provide traction and prevent the mat from slipping or moving around while in use. The mat and the neck support cushion are joined together as one continuous element so when not in use, the mat is adapted to roll around the neck support cushion and secure in a closed position. In certain embodiments the distal end of the mat contains a slightly raised "stop guard" to further secure the instrument and prevent slippage. Preferably the stop guard is made of a soft material such as used for the neck cushion or the maintenance mat. It may be molded into place or removable.

Preferably, the mat is made of Memory Foam, Closed-Cell Rubber Foam, PVC Foam, PU foam, Jute, Natural Rubber, Nitrile butadiene rubber (NBR), Thermoplastic elastomers (TPE) or a combination thereof. Alternatively, a soft cushioned fabric may also be used for the mat such as, for example, a plush fabric or a thick fleece fabric. Plush fabric is a buttery soft, fluffy fabric with a short pile and is incredibly tactile. A preferred mat is between about ⅛ to ¼ inch thick.

In certain embodiments the mat is textured. The texture of the mat dictates how much traction it provides. Texture can be either man-made (a pattern of raised bumps, for example) or dictated by the materials—jute mats have an organic roughness to them, while PVC mats, though slightly textured, have a softer feel.

PVC mats have a high sticky factor. Typically a PVC mat is made of PVC resin powder and anti-tearing fiber open-cell foamed under high temperature. Natural Rubber Mats are made sustainably with natural rubber tapped from rubber trees. Nitrile butadiene rubber (NBR) is typically formed from butadiene and acrylonitrile by an emulsion polymerization method. Thermoplastic elastomers (TPE), sometimes referred to as thermoplastic rubbers, are a class of copolymers or a physical mix of polymers (usually a plastic and a rubber) which consist of materials with both thermoplastic and elastomeric properties. Thermoplastic elastomers show advantages typical of both rubbery materials and plastic materials and can be recycled and reused which do no harm to environment after discarding.

The mat and/or the neck support may optionally be lined with a soft fabric material such as, for example, cotton, satin, fleece, wool, or felt. Preferably, the linings are of a material that is non-abrasive. Such a material can function to protect the delicate finish of the instrument and to reduce slipping of the same during device operation.

The Length and width of the mat portion of the claimed device will, of course, depend on the type of instrument the mat is designed for. However, a typical device designed to accommodate a typical guitar is between about 13-17 inches wide and 25-33 inches long. Preferably, the mat is between about 14-16 inches wide and 27-31 inches long. Of course, the length and width will depend on the instrument.

Of course, these dimensions are exemplary in nature, as other embodiments are contemplated having any number of different dimensions.

Closure

While a preferred closure material is a hook and loop material (i.e. Velcro®), other closure materials are contemplated. For example, closure can be accomplished through the use of any number of commercially available connectors such as, magnetic elements, hooks, snaps, ties and/or buttons. The closure allows the distal end of the mat to be removably secured to the mat when in a rolled configuration.

Figure 2:
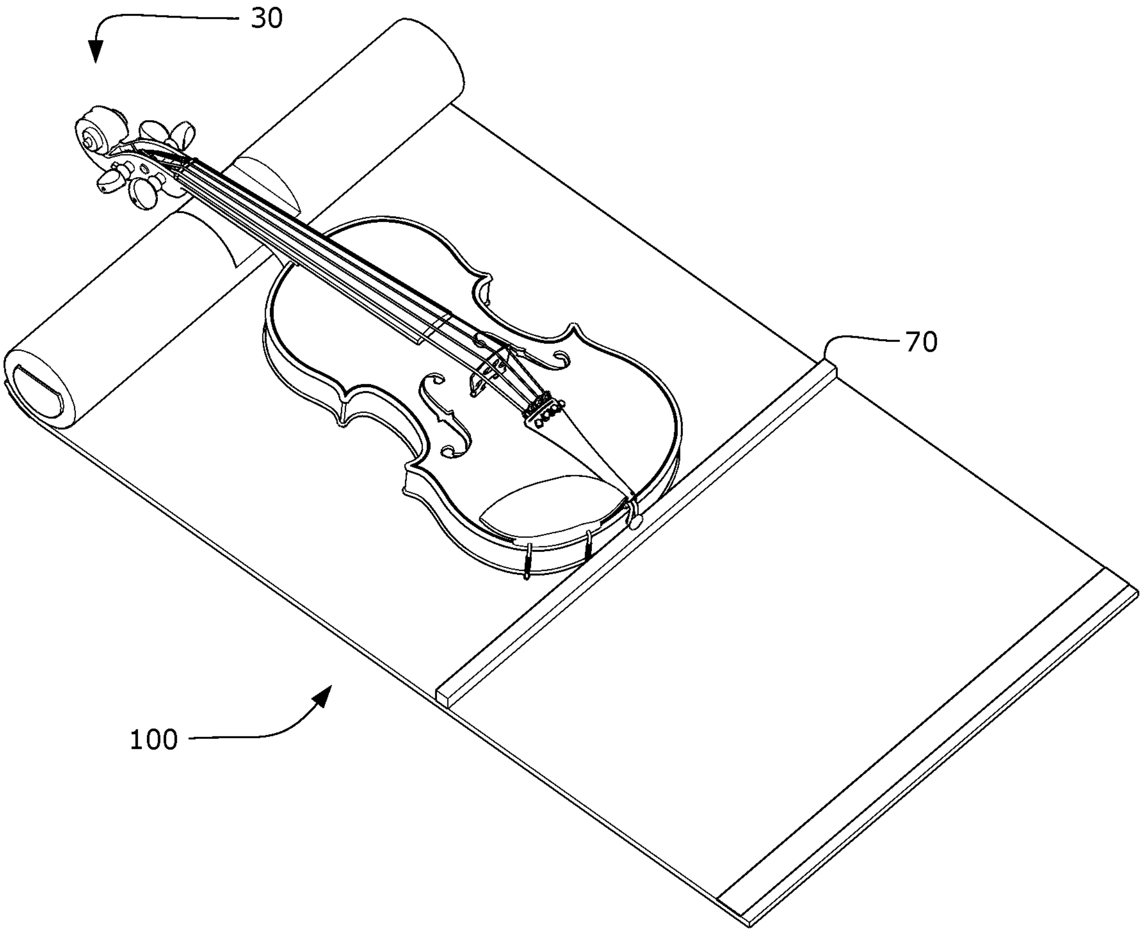
FIG. 2 is an isometric view of a device according to the claimed invention which incorporates an optional stop guard (70) towards the distal end of the maintenance mat.
Figure 3:
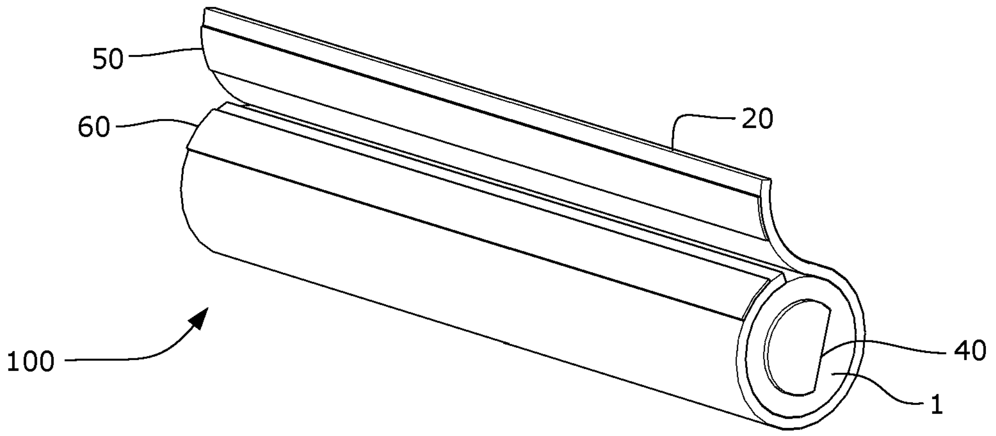
FIG. 3 is an isometric view of a preferred embodiment of the present invention shown in a rolled storage configuration incorporating a hook and loop closure system; Hook and loop closure 50 is located on the front (upper side) of the mat on the end of the mat furthest away from the neck cushion. Hook loop closure 60 is located on the underside of the mat in a location that will meet up with and secure to hook loop closure 50 when the mat is in a rolled configuration.
Figure 4:
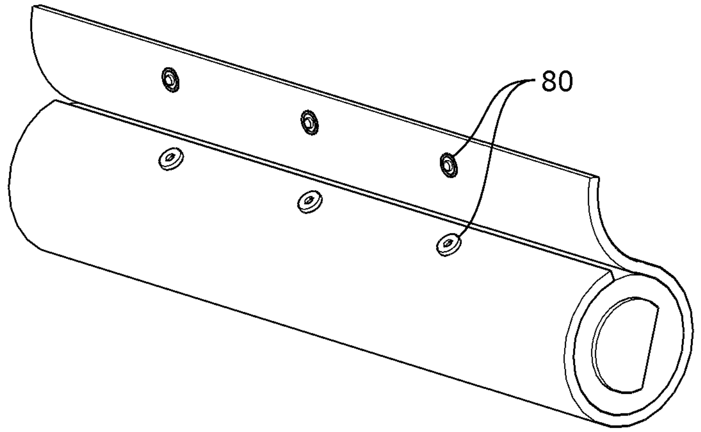
FIG. 4 is an isometric view of a preferred embodiment of the present invention shown in a rolled storage configuration incorporating a snap closure system (80)
Figure 5:
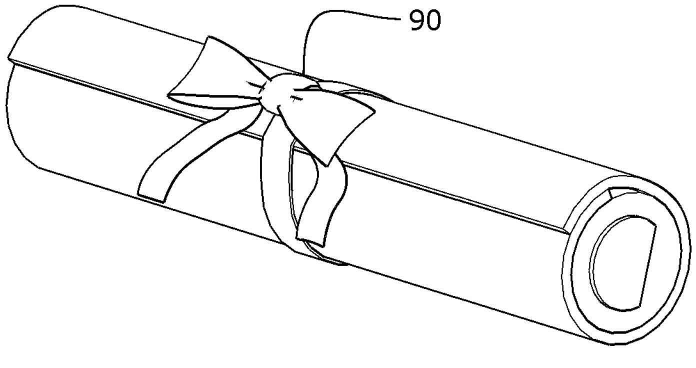
FIG. 5 is an isometric view of a preferred embodiment of the present invention shown in a rolled storage configuration incorporating a tie closure system (90)
Figure 6:
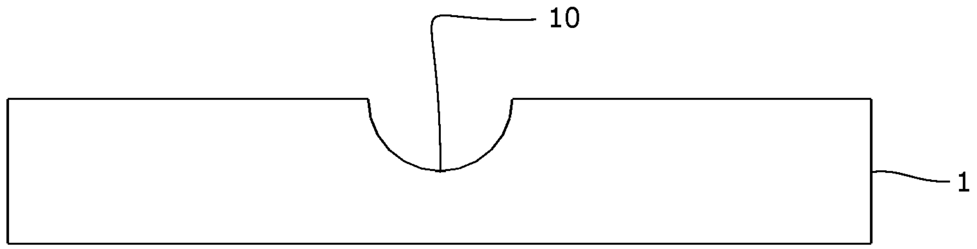
FIG. 6 is a front elevation view of the neck support utilizing a preferred neck cushion indent profile with a U-shaped indentation.
Figure 7:
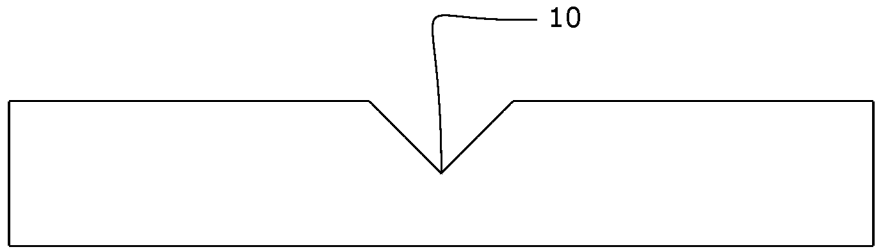
FIG. 7 is a front elevation view of a neck support utilizing a preferred neck cushion indent profile with a V configuration.
Figure 8:
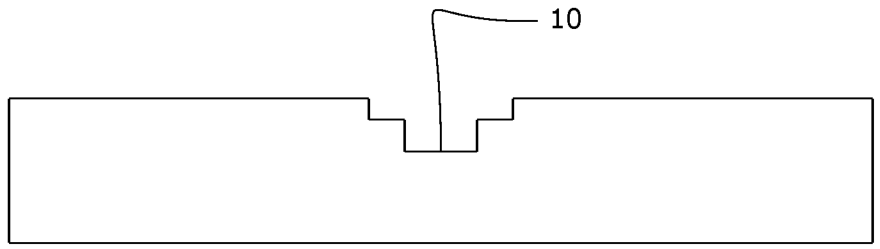
FIG. 8 is a front elevation view of the neck support utilizing a preferred neck cushion indent profile with a stepped indentation.

Optionally, the claimed device may additionally contain pockets for storing strings, string winder, picks etc. The optional pockets may be preferably located on the underside of the mat or on the ends of the neck support cushion such as shown in FIGS. 1 and 2.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. From the foregoing description, one skilled in the art can easily ascertain the essential characteristics of this invention and, without departing from the spirit and scope thereof, can make various changes and modifications of the invention to adapt it to various usages and conditions.

I claim:

1. A portable one piece maintenance mat with neck support comprising a) neck support cushion having a top side and a bottom side, said neck support cushion having a centrally located indent on the topside adapted to receive the neck of a stringed instrument, b) a maintenance mat having a proximal end and a distal end, said mat attached on said proximal end to the bottom side of said neck support and having a closure on said distal end, wherein said mat is adapted to roll around said neck support be removably secured at said closure and wherein said indent is between 2.5 to 3.7 inches wide and has depth of between 1.5 and 2 inches.

2. The maintenance mat with neck support according to claim 1, wherein said closure is hook/loop, a magnetic element, hooks, snaps, ties and/or buttons.

3. The maintenance mat with neck support according to claim 1, wherein said mat is memory foam, Closed-Cell Rubber Foam, PVC Foam, PU foam, Jute, Natural Rubber, Nitrile butadiene rubber (NBR), Thermoplastic elastomers (TPF) or a combination thereof.

4. The maintenance mat with neck support according to claim 1, wherein said neck support is made of polyethylene, polystyrene, Styrofoam, high density foam, high resilience foam, polyurethane, memory foam, closed cell foam, and/or open cell foam.

5. The maintenance mat with neck support according to claim 1, wherein said mat is between about ⅛ to ¼ inch thick.

6. The maintenance mat with neck support according to claim 1, wherein said mat and the neck support cushion are joined together as one continuous element.

7. The maintenance mat with neck support according to claim 1, wherein said mat is between 13-17 inches wide.

8. The maintenance mat with neck support according to claim 1, wherein said mat is 25-33 inches long.

9. The maintenance mat with neck support according to claim 1, wherein said distal end of said mat further contains a stop guard (70).

10. The maintenance mat with neck support according to claim 1, wherein said indent is v-shaped or u-shaped.

* * * * *